United States Patent [19]

Lewis

[11] Patent Number: 4,562,613
[45] Date of Patent: Jan. 7, 1986

[54] POULTRY DISSECTING APPARATUS

[76] Inventor: Eugene J. Lewis, Rte. 1, Box 306, Demorest, Ga. 30535

[21] Appl. No.: 604,897

[22] Filed: Apr. 27, 1984

[51] Int. Cl.$^4$ .............................................. A22C 21/00
[52] U.S. Cl. ........................................... 17/11; 17/57
[58] Field of Search .................... 17/11, 56, 57, 61, 62, 17/63, 11.1 R, 12, 44.1, 52

[56] References Cited

U.S. PATENT DOCUMENTS

| | | | |
|---|---|---|---|
| 2,807,046 | 9/1957 | Hebenheimer | 17/11 |
| 4,016,624 | 4/1977 | Martin et al. | 17/11 |
| 4,306,335 | 12/1981 | Hawk et al. | 17/11 |
| 4,407,046 | 10/1983 | Wright | 17/11 |

Primary Examiner—James M. Meister
Assistant Examiner—John L. Knoble
Attorney, Agent, or Firm—Willard M. Hanger

[57] ABSTRACT

Outwardly extending pivoted breast shields are provided in an apparatus for poultry carcass dismemberment for protecting the poultry breast from the wing severing blades. The shields are movably mounted between a first position ahead of the severing blade and a second position rearward of the blade.

14 Claims, 9 Drawing Figures

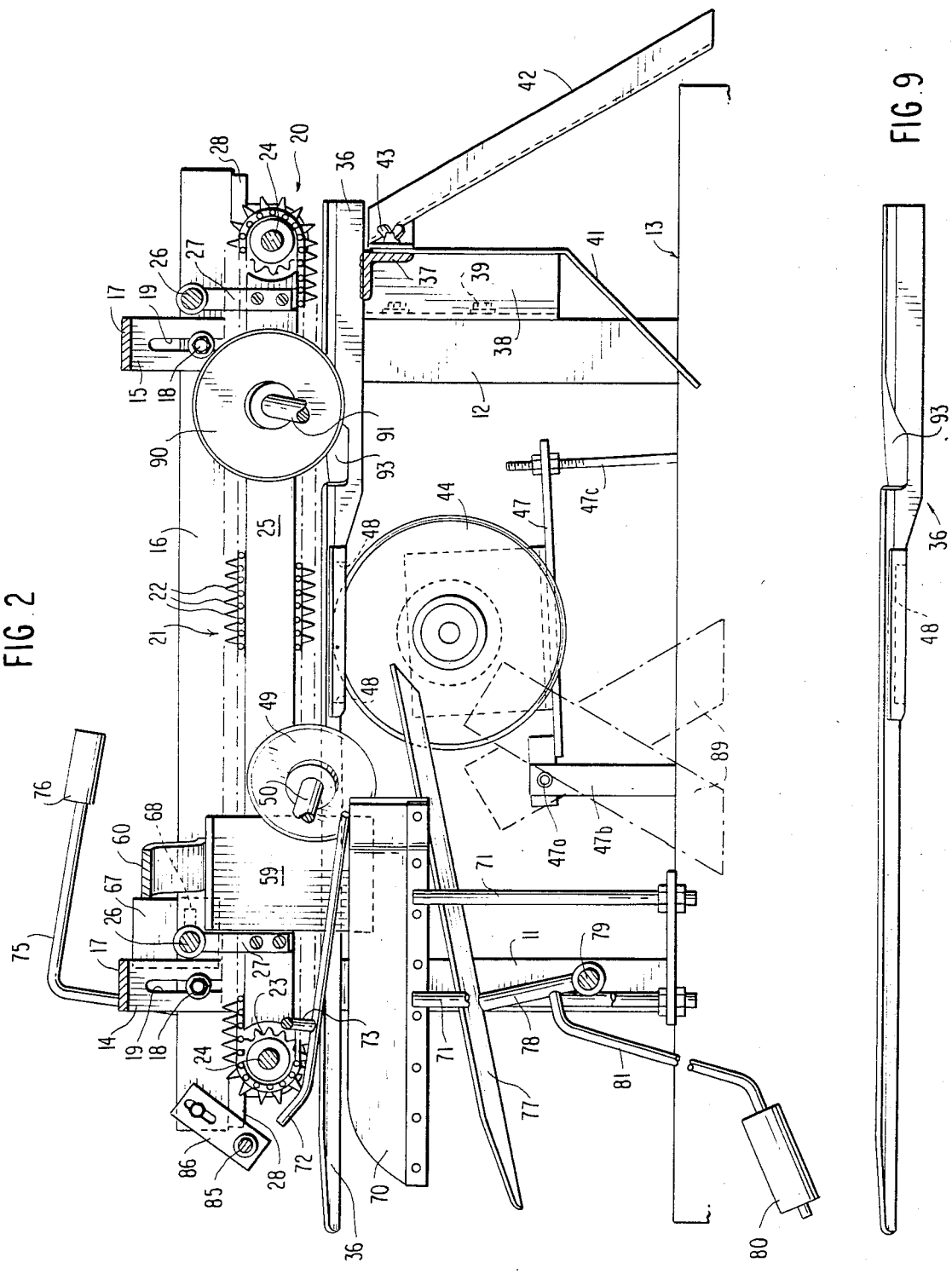

POULTRY DISSECTING APPARATUS

BACKGROUND OF THE INVENTION

The present invention is a modification of the poultry breast splitting device of my U.S. Pat. No. 4,270,243 and is utilized for the same general purpose of dismembering poultry carcasses and separating them into component parts which can be separately packaged for the market. Although the device of this invention splits the breast of a poultry carcass into halves, as does the above identified patent, it is utilized to dissect the entire upper body portion of a poultry carcass comprising the wings and the breast affixed to the backbone. The safety features of the above identified patent are retained and others are incorporated.

Machines of various designs have been utilized in the past to dismember poultry carcasses for removal of the various components for separate packaging, some devices performing single operations, as in my above identified patent, and other devices dismember the entire carcass by removing the individual components one by one, of which U.S. Pat. No. 4,016,624 is an example. The manner of severing and dismembering the carcasses and the actual severing tools utilized varies widely among the prior art patents, of which a number are listed in U.S. Pat. Nos. 4,016,624 and 4,270,243. However, many of the previous poultry carcass dismembering devices are complex devices requiring extensive maintenance and adjustment. The apparatus of the present invention is an adaptation of my prior invention and provides a reliable and efficient device for use in a rapid and automated process for dismembering poultry carcasses into their component parts with full protection to the machine operator.

SUMMARY OF THE INVENTION

The present invention provides an endless, toothed conveyor moving continuously along the length of and a short distance above an elongated spear upon which the upper body portion of a poultry carcass is impaled with the lower run of the toothed conveyor in contact with the back of the carcass propelling it along the spear through a rotating, vertically arranged circular breast splitting blade having its upper segment extending into a slot in the spear and a breast support guide pivotally mounted for vertical motion beneath the forward portion of the spear in the same general manner as in the device of my U.S. Pat. No. 4,270,243. In this invention, wing spreading and support guides extend along and spaced outwardly of opposite sides of the spear ahead of the breast splitting blade and terminate in the vicinity of a pair of rotating, wing severing blades each having an angularly arranged face with its leading edge in close proximity to and on each side of the spear slightly forwardly of the breast splitting blade. Downwardly depending breast shields supported from outwardly extending, pivotally mounted arms on each side of the spear are movably positioned between the spear and the segment of each wing splitting blade nearest the spear for rearward swinging motion between each wing severing blade and the spear. A pair of facing, rotating backbone severing blades are arranged in a slightly angular relationship above and on each side of the spear rearwardly of the breast splitting blade with the bottom blade segments extending into a groove in each side of the spear.

An object of the invention is to provide an apparatus for dismembering into component parts the upper body portion of a poultry carcass comprising the wings, breast and backbone.

Another object of the invention is to provide an apparatus for continuously, in sequence, dismembering into its component parts the upper body portions of poultry carcasses.

A further object of the invention is to provide an apparatus for removing the wings and breast from the upper body portion of a poultry carcass.

Yet still a further object of the invention is to provide a safe apparatus for the operator in removing the wings and breast of the upper body portion of a poultry carcass and splitting the breast into two halves.

DRAWINGS

A preferred embodiment of the invention can be best understood by referring to the following description taken in connection with the accompanying drawings in which:

FIG. 2 is a longitudinal section of the apparatus.

FIG. 9 is a side elevation of the spear.

DESCRIPTION OF A PREFERRED EMBODIMENT OF THE INVENTION

Figure 3:
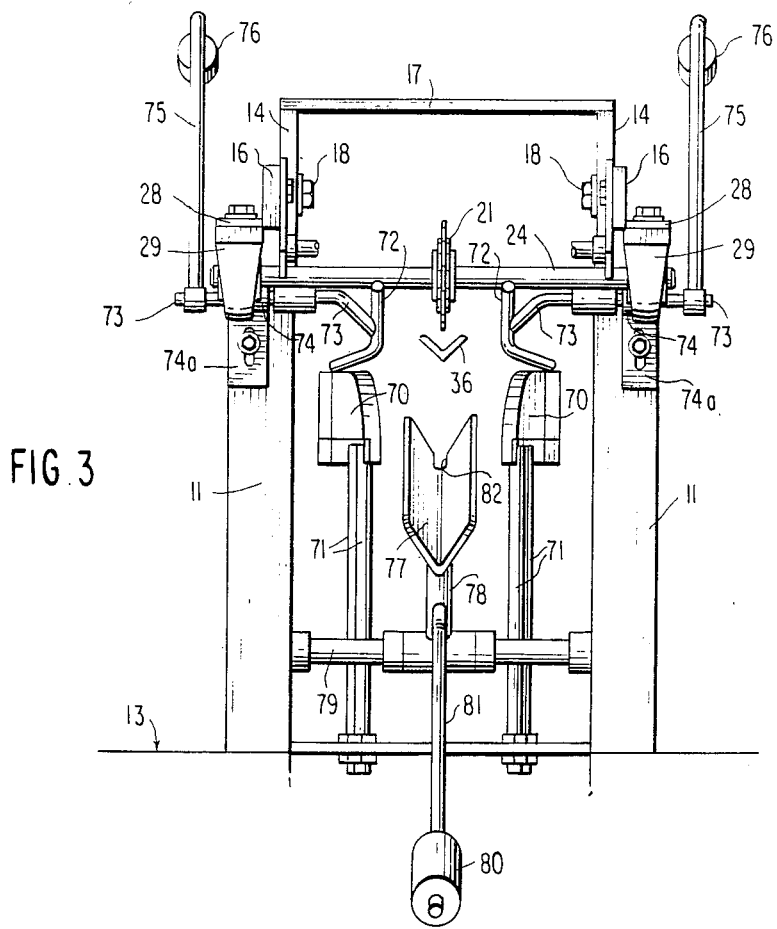
FIG. 3 is a front elevation view of the apparatus with components in the background omitted.
Figure 5:
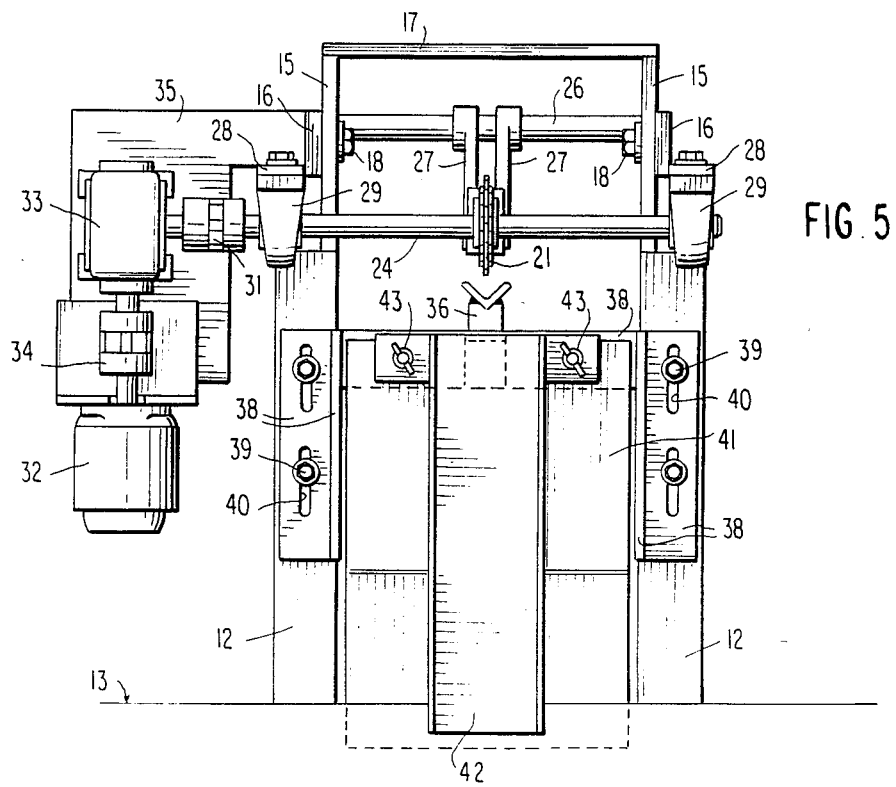
FIG. 5 is a front elevevation view of the apparatus with component parts in the background omitted.

Referring first to FIGS. 2, 3 and 5 the basic frame on which the toothed conveyor 10 and other components are supported comprises a pair of vertically extending front posts 11, a pair of vertically extending rear posts 12, the bottom portions of each of the posts being supported from a base table of which the bottom surface 13 is indicated in the drawings, flanges 14 extending upwardly from the top of each front post 11, flanges 15 extending upwardly from the top of each rear post 12, a pair of side rails 16 each extending longitudinally of the frame between each pair of front and rear post flanges 14, 15, and cross members 17 extending transversely of the frame between the top of each of the front post flanges 14 and rear post flanges 15. The side rails 16 are mounted for vertical adjustment on the post flanges 14, 15 by bolts 18 extending through slots 19 in the post flanges.

As best seen in FIGS. 2, 3 and 5, an endless toothed conveyor 20, comprising an endless chain 21 with connecting links 22 having outwardly extending teeth supported at each end by spur wheels 23 keyed to a shaft 24 rotatably supported at each end of the conveyor grooved chain support rail 25, is supported from the side rail 16 by a pair of transversely extending support rods 26 respectively attached to the forward and rear portions of the conveyor chain support plate 25 by brackets 27. Bearing brackets 28, extending outwardly from the front and rear portions of each of the frame side rails 16, support spur wheel shaft bearings 29 that are affixed to the underside of the bearing brackets 28, the front bearings being adjustable longitudinally by slots 30 in the front bearing brackets 28 and the rear bearings being fixed and aligned with the rear spur wheel shaft 24 by the coupling 31 that is connected to the conveyor drive motor 32 through the reduction gears 33 and coupling 34, which in turn are supported from a side rail 16 by a supporting bracket 35.

Figure 1:
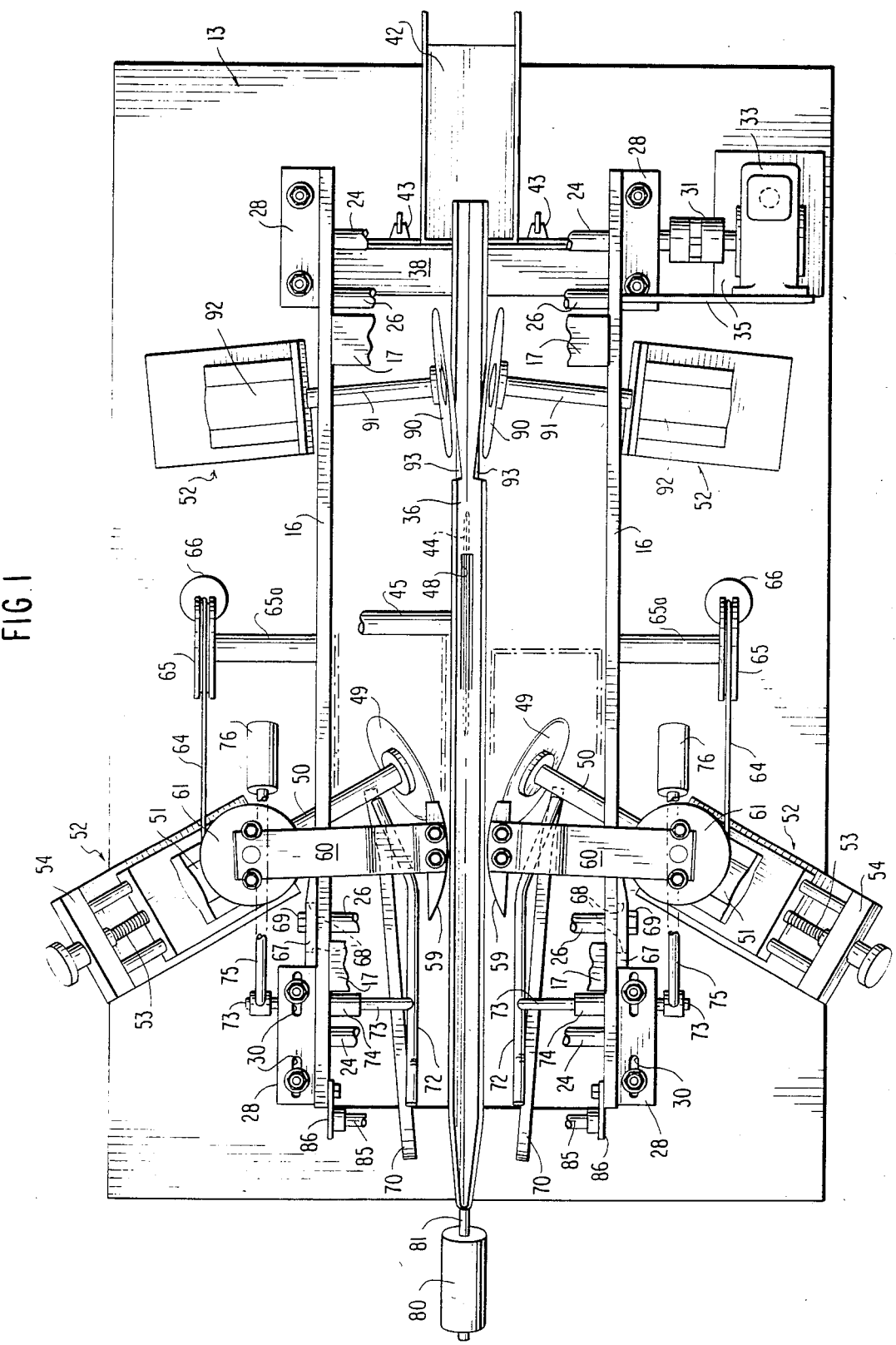
FIG. 1 is a top plan view of the apparatus with the toothed conveyor and certain other components omitted for clarity.

An elongated, poultry impaling spear 36 (FIG. 9) extends longitudinally of and immediately beneath the lower reach of the toothed conveyor 20 and is cantileverally supported from its rear end portion on the frame by a transversely extending angle iron support 37 connected at each end for vertical adjustment by an L Channel 38 bolted to the rear frame posts 12 by bolts 39 extending through slots 40 to permit vertical adjustment of the spear 36, as best seen in FIGS. 1, 2 and 5. A breast half deflector plate 41 and backbone chute 42, whose functions will be subsequently described, are affixed to the spear angle iron support 37 by wing bolts 43.

Figure 4:
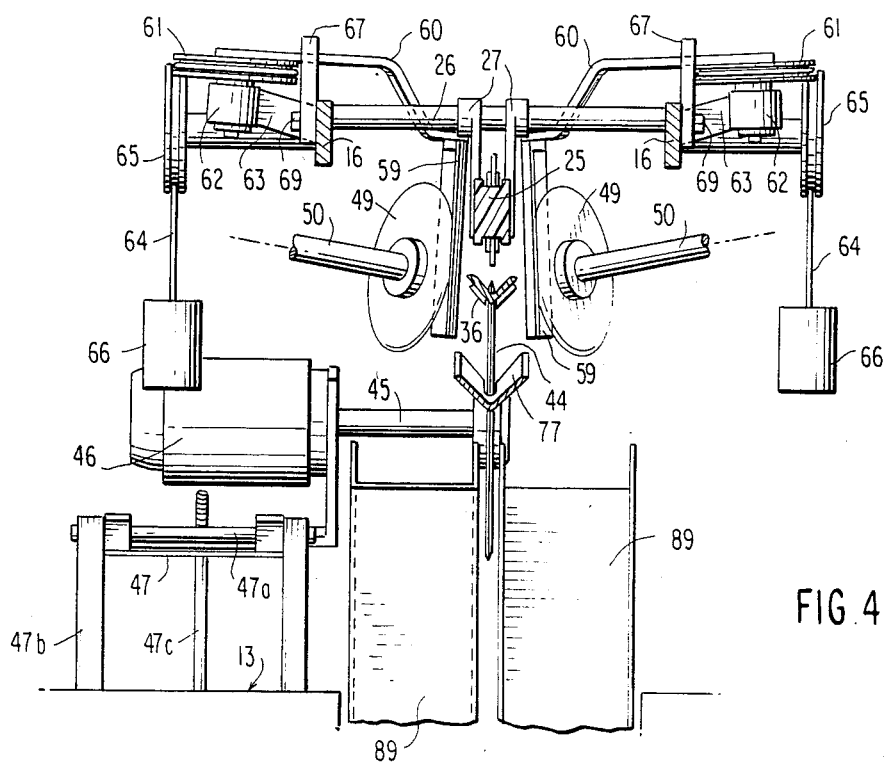
FIG. 4 is a transverse, elevation section of the apparatus forwardly of wing severing blades with components in the background omitted.

Referring now to FIGS. 2 and 4, a circular breast splitting blade is supported for rotation by drive shaft 45 below a central portion of the spear 36 for rotation in a vertical plane by the motor 46 supported from the table top 13 by a pivotable frame 47 connected at one end by pivot 47a to a vertically extending support post 47b and at the other end by the threaded rod 47c to be vertically adjustable with the upper segment of the blade 44 extending through a slot 48 in the central portion of the spear 36.

Figure 6:
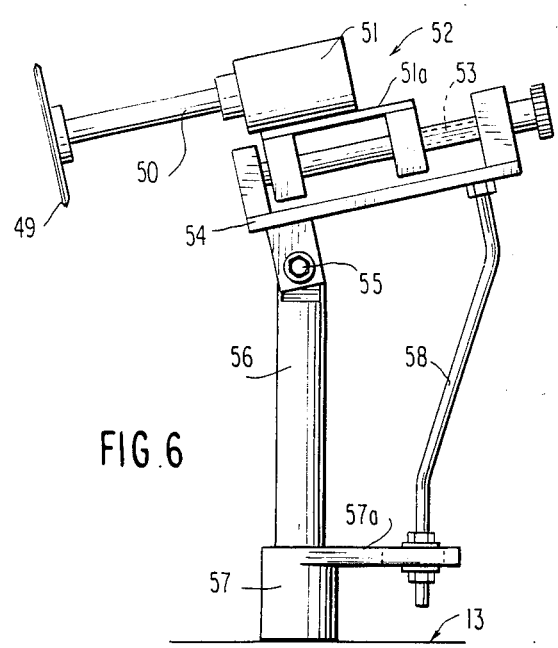
FIG. 6 is a schematic illustration of a severing blade and driving motor adjustable mounting arrangement.

Referring now to FIGS. 1, 2 and 4, a pair of circular wing severing blades 49, supported for rotation by drive shafts 50 powered by motors 51, are positioned slightly forwardly of the breast splitting blade 44 on each side of the spear 36 with the plane of each blade angled downwardly and rearwardly such that the foremost leading edge of each severing blade 49 is in close proximity to the spear. Each wing severing blade 49 and its driving motor 51 are supported from the table top 13 for adjustment in three mutually perpendicular planes, as schematically represented by the tiltable, rotatable frame 52 shown in FIG. 6. The motor 51 is affixed to the base 52 which is supported for longitudinal motion by the thread screw 53 that is rotatably supported from upwardly extending segments of the base foundation 54 which is tiltably mounted at its forward end by pivot 55 to a vertically extending stanchion 56 in a manner to be tiltable in a vertical plane and is connected at its rear end to an extension 57a of a foot 57, in which the stanchion 56 is rotatably supported, by an elongated, vertically extending rod 58 which has connections to the foundation 54 and foot extension arm 57a for both rotation and vertical adjustment permitting the motor foundation 54 to be pivoted horizontally. The structure of the tiltable, rotatable frame 52 shown in FIG. 6 is a schematic representation of an arrangement in which the position of the wing severing blades 49 and its driving motor 51 are adjustable in three mutually perpendicular planes and obviously many sophisticated design embodiments of such a three plane adjustable support are feasable. A pair of downwardly extending wing chutes 89, illustrated in FIG. 4 and in dotted lines in FIG. 2, are supported on each side of and below the spear 36 in the vicinity of the wing severing blades 49, the function of which will be subsequently discussed.

As can best be seen in FIGS. 1, 2 and 4, forwardly of the breast severing blade 44 in the vicinity of each wing severing blade 49, a vertically depending breast shield 59 is supported for arcuate swinging movement on each side of the spear 36 from a support arm 60 affixed to and extending horizontally inwardly from a horizontal pulley 61 rotatably mounted in a bearing 62 supported by an extension 63 of a frame side rail 16. Each pulley 61 is grooved with an end of a cord 64 affixed to the pulley to extend around the groove and then rearwardly to a grooved vertical pulley 65 that is rotatably supported by an extension 65a from a side rail 16, the cord 64 extending around the groove in the vertical pulley 65 and then downwardly with a counterweight 66 being affixed to the lower end of the cord 64. An adjusting block 67 is affixed to each frame side rail 16 forwardly of each breast shield support arm 60 by bolt 69 extending through a slot 68 in the adjusting block 67 for adjustment of the normal forward position of the breast shield support arm 60.

As best seen in FIGS. 1, 2 and 3, an elongated, vertically oriented, lower wing guide plate 70 is supported by a pair of vertically adjustable support rods 71 on each side of the forward portion of the spear 36 at a small diverging angle from the spear with the forward end of each guideplate 70 adjacent the forward end of the spear and its top edge slightly below the level of the spear. Above each lower wing plate guide 70 an elongated upper wing guide rod 72 is pivotally supported to be generally parallel to the spear 36 by a transversely extending segment 73 rotatably supported in bearing 74 connected by support plate 74a to a front frame post 11 for vertical adjustment with the outer end of the transversely extending segment 73 being affixed to a vertically oriented, rearwardly extending counter balancing rod 75 having a weight 76 on its end. The counter weight normally maintains the forward end of the upper wing guide rod 72, which is angled outwardly to overlie the lower wing guide plate 70, in contact with the rear portion of the lower wing guide plate.

In much the same manner as in U.S. Pat. No. 4,270,243, an elongated trough shaped breast guide 77 is supported for pivotal movement vertically below the spear 36 by a support arm 78 having its lower end supported for rotation by the shaft 79 extending transversely of the frame between the front post 11, a biasing counter weight 80 being affixed ahead of the support arm 78 by the downwardly curving counter weight arm 81. The rear portion of the breast guide 77 extending into the area of the breast splitting blade 44 has a central slot 82 to provide clearance for the breast splitting blade.

Figure 8:
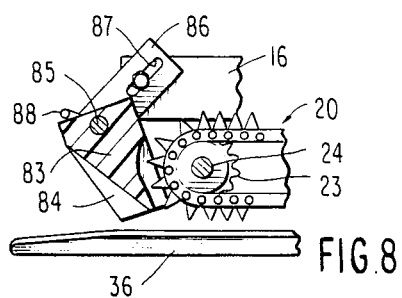
FIG. 8 is a sectional, side elevation of FIG. 7.
Figure 7:
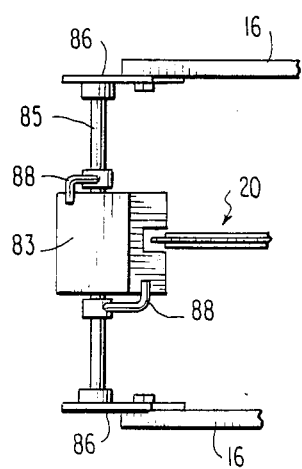
FIG. 7 is a plan view from above of a safety block feature mounted on the forward end of the apparatus.

As best seen in FIGS. 7 and 8, a safety block 83 having a frontal cavity 84 is supported above the front portion of the spear 36 for rotation about a support shaft 85 of which the ends are supported from the frame side rail 16 by end plates 86 having an adjusting slot 87 through which the end plates are bolted to each side rail 16. Divergently extending front and rear stops 88 affixed to the support shaft 85 extend over the top and rear faces of the safety block 83 to restrict pivotal motion of the block from its normal forwardly facing position, illustrated in FIGS. 7 and 8, in which the forward-most stop is in contact with the top face of the safety block and is rotated into contact with the rear stop when a carcass is placed on the front end of the spear 36.

Referring now to FIGS. 1 and 2, a pair of circular backbone severing blades 90, supported for rotation by drive shafts 91 rotated by motors 92, are positioned rearwardly of the breast splitting blade 44 on each side of the spear 36 with the plane of each backbone severing blade angled slightly rearwardly and upwardly such that the lowermost edge of each blade extends into the interior of the rear portion of the spear 36 into which grooves 93 have been cut into each side of the spear (FIG. 9). The backbone severing blades 90 are adjustable in three mutually perpendicular planes through tiltable, adjustable mountings of the motors 92 in much the same matter as for the wing severing motors 51. A pair of breast half chutes (not illustrated) are normally installed below the spear 36 to extend outwardly from each side of the spear rearwardly of the breast splitting blade 44 to carry away the breast halves that are split, as will be subsuquently described. It should be understood that the motors utilized as prime movers in this invention can be of any convenient type, such as electric, hydraulic, Pnuematic, etc. with appropriate controls such as will provide a convenient and efficient manner of providing power.

The machine of this invention is utilized in processing the upper body portion of poultry carcasses from which the lower body portion of the legs and thighs has been severed. A machine operator impales the upper body portion of the carcass by inserting the open rear end of the carcass onto the pointed forward end of the spear 36 followed by the neck opening with the backbone of the carcass resting on the trough formed along the top surface of the V-shaped spear, much the same as in my U.S. Pat. No. 4,270,243 except that the position of the poultry carcass is reversed so that the neck opening trails. As the carcass is pushed forwardly onto the spear 36 the carcass backbone is contacted by the downwardly projecting teeth of the lower run of the conveyor 20 which propels the carcass along the spear such that the carcass breast contacts the trough of the forwardly tilted, V-shaped breast guide 77 which is then pivoted into a feed position substantially parallel and below the spear 36 as the carcass slides along the length of the spear 36 toward the breast splitting blade 44, in the same manner as in my aforementioned U.S. Pat. No. 4,270,243. As the carcass is pushed forwardly onto the spear 36, the back contacts the cavity 84 of the safety block 83 which is then pivoted rearwardly to provide clearance for the carcass to move forwardly into contact with the teeth of the conveyor 20, thereby preventing the hand of the operator being inserted sufficiently far into the apparatus to become damaged. As the carcass is inserted onto the forward end of the spear 36 the wings, extending outwardly from both sides of the carcass, each contact the top surface of the respective lower wing guide plate 70. As is apparent from FIGS. 2 and 3, the forward portion of each upper wing guide rod 72 overlying the forward portion of the respective lower wing guide plate 70 is curved upwardly in a manner that the wing becomes trapped between the upper and lower wing guides as the carcass is propelled along the spear. As each wing comes into contact with and is moved rearwardly between the converging upper and lower wing guides 70 & 72, the movable upper wing guide rod 72 is pivoted by the pressure exerted from the wing around its transversely extending segment 73 against the pressure of the counter weight 76. This causes each wing trapped between the wing guides to be maintained in an outwardly spread configuration as the wing moves into the rear portions of the wing guides 70 & 72 that are arranged to diverge slightly from the spear in the region ahead of the wing severing blades 49. As the carcass comes abreast of the diverging rear portions of the wing guides 70 & 72 a short distance ahead of the leading edge of the wing severing blades 49, each side of the carcass breast contacts a respective breast shield 59 which is pivoted rearwardly against the force of the counter weight 66 in an arc maintaining the breast shield between the carcass breast and each wing severing blade 49 to protect the breast from the wing severing blade 49 as it cuts through the wing ball and socket joint and tendon in severing the wing from the carcass being propelled along the spear 36. After being severed each wing falls into and is collected into the respective wing chutes 89 located below the apparatus. When the carcass breast has passed beyond the leading edge of each wing severing blade 49 and loses contact with the breast shield 59, the counter weight 66 pivots the breast shield support arm 60 forwardly until contacting the positioning block 67 which maintains the support arm at the normal forward position of the breast shield. After passing the wing severing blades 49 the carcass is then propelled through the breast splitting blade 44 which operates to split the breast into two halves much in the same manner as in my aforesaid U.S. Pat. No. 4,270,243, the breast guide 77 pivoting forwardly to its normal position by the counter weight 80 after losing contact with the carcass breast. As the carcass is propelled rearwardly along the spear 36 past the breast splitting blade 44, the backbone resting on the top of the spear is brought into contact with the lower edges of the angularly arranged rotating backbone severing blades 90 that extend into the grooves 93 in both sides of the top portion of the spear 36, thereby severing from the backbone the previously split breast halves which then fall away and are deflected by the deflector plate 41 into collection chutes located below the apparatus. After passing through the severing blades 90 the backbone falls into the disposal shute 42 after leaving the rear terminus of the lower run of the conveyor 20.

As is clearly evident from this description, my invention makes it possible to quickly, efficiently and continuously dismember the upper body portion of poultry carcasses in sequence as rapidly as an operator can impale each carcass onto the spear of the apparatus with complete safety to the operator. The provisions described for adjusting the positions of the components of the apparatus permit the apparatus to accomodate various sizes of poultry.

Although the above described embodiment includes the pivotable trough shaped breast guide 77 and the ratating breast splitting blade 44 of my aforementioned U.S. patent, either or both of these features could be omitted in alternate embodiments in which the function of the features is not necessary or desirable in processing poultry carcasses. Similarly any of the wing (appendage) supports 70 & 71, the wing (appendage) severing blades 49 or the backbone severing blades 90 could be omitted from an embodiment utilizing a portion only of the disclosed carcass dismembering components so as to provide a machine for processing poultry carcasses of various types and dismembering components so as to provide a machine for processing poultry carcasses of various types and dismembering them into a variety of components.

It should be clearly understood that the foregoing disclosure describes only one preferred embodiment of the basic form of my invention and that numerous modifications or alterations may be made in the apparatus without departing from the spirit and scope of my invention as set forth in the appended claims.

I claim:

1. In a poultry carcass dissecting apparatus having an elongated spear adapted to support a carcass impaled thereon for movement along the spear by a conveyor supported in closely spaced adjacency to the spear through a carcass breast splitting means mounted for vertical motion in the plane of said spear for splitting into halves the carcass breast joined to the carcass backbone, the improvement of carcass appendage extension means spaced outwardly of each side of said spear to extend longitudinally thereof rearwardly from the spear forward end portion for contacting and maintaining the appendage on each side of the carcass in an outwardly extended position as the impaled carcass is conveyed along said spear, appendage severing means supported on each side of in close proximity of said spear forwardly of said breast splitting means for cutting through the joint joining the extended carcass appendages to the carcass backbone as the impaled carcass is moved along said spear, a pair of vertically depending breast shields, and means supporting each said breast shield in close adjacency to and on opposite sides of said spear for movement between a first position ahead of said appendange severing means and a second position rearwardly of said appendage severing means, said breast shield and supporting means being adapted for passage of said shield between said appendage severing means and said spear in moving between said first and second positions through contact with the impaled carcass moving along said spear.

2. The apparatus of claim 1 wherein said appendage severing means comprises a pair of circular cutting blades mounted for rotation by motors with the plane of rotation of each blade intersecting the vertical plane of said spear at an acute angle and the segment of each blade closest said spear spaced therefrom a distance providing clearance between said spear and closest blade segment for passage of said breast shield in moving between said first and second positions.

3. The apparatus of claim 2 wherein said breast shield supporting means comprises pivotable supporting means for swinging said breast shields in an arc between said first and second positions, said breast shield having a cross section of general arcuate shape.

4. The apparatus of claim 1 additionally comprising backbone severing means supported in close adjacency above and extending into grooves, a grooved area extending into the upper portion of said spear rearwardly of said breast splitting means for severing the two carcass split breast halves from the carcass backbone being moved by said conveyor along said spear.

5. The apparatus of claim 4 wherein said backbone severing means comprises a pair of circular cutting blades mounted for rotation by motors with the plane of each blade being vertically oriented in coincidence with respective grooves extending into each side of said spear, each said spear groove extending partially into said spear from the top surface at an acute angle to the longitudinal axis of said spear.

6. The apparatus of claim 2 additionally comprising backbone severing means supported in close adjacency above and extending into a grooved area extending into the upper portion of said spear rearwardly of said breast splitting means for severing the two carcass breast halves from the carcass backbone being moved by said conveyor along said spear.

7. The apparatus of claim 3 additionally comprising backbone severing means supported in close adjacency above and extending into a grooved area extending into the upper portion of said spear rearwardly of said breast splitting means for severing the two carcass split breast halves from the carcass backbone being moved by said conveyor along said spear.

8. The apparatus of claim 7 wherein said backbone severing means comprises a pair of circular cutting blades mounted for rotation by motors with the plane of each blade being vertically oriented in coincidence with respective grooves extending into each side of said spear, each said spear groove extending partially into said spear from the top surface at an acute angle to the longitudinal axis of said spear.

9. An apparatus for severing a poultry carcass appendage from the breast containing portion of the carcass comprising means for conveying a poultry carcass along a predetermined path, means adjacent each side of said path operable to sever an appendage from the breast containing portion of the carcass, a vertically depending breast shield, and means supporting said breast shield in close adjacency to said predetermined path for movement along said path between a first position ahead of said appendage severing means and a second position rearwardly of said appendage severing means, said breast shield and supporting means being adapted for passage of said shield between said appendage severing means and the portions of said predetermined path occupied by the carcass in being conveyed along said predetermined path during said shield movement between said first and second positions.

10. The apparatus of claim 9 wherein said breast shield supporting means comprises pivotable supporting means for swinging said breast shield in an arc between said first and second positions, said breast shield having an arcuate cross sectional shape.

11. The apparatus of claim 10 wherein said supporting means comprises an arm pivotally supported at one end spaced outwardly of said predetermined path and at the other end being affixed to said breast shield of arcuate shape depending vertically therefrom.

12. The apparatus of claim 9 additionally including a circular breast splitting blade rotated by motor means with the blade vertically oriented in the plane of said predetermined path and spaced along said path from said appendage severing means in the region of said path through which the mid portion of the carcass breast passes for being split into halves by the blade.

13. The apparatus of claim 12 additionally including backbone severing means supported above and extending into said predetermined path from opposite sides thereof in a spaced relationship rearwardly on said path from said breast splitting blade for severing the backbone of the carcass from the split breast halves.

14. The apparatus of claim 13 wherein said shield supporting means comprises an arm pivotally supported at one end outwardly of said predetermined path and at the other end being affixed to said breast shield of general arcuate cross sectional shape depending vertically therefrom.

* * * * *